(12) United States Patent
Chalasani

(10) Patent No.: US 9,864,585 B2
(45) Date of Patent: Jan. 9, 2018

(54) RAPID PROTOTYPING OF BACKEND SERVICES

(71) Applicant: Accenture Global Services Limited, Dublin (IE)

(72) Inventor: Chaitanya Chalasani, Bengaluru (IN)

(73) Assignee: Accenture Global Services Limited, Dublin (IE)

( * ) Notice: Subject to any disclaimer, the term of this patent is extended or adjusted under 35 U.S.C. 154(b) by 569 days.

(21) Appl. No.: 14/537,166

(22) Filed: Nov. 10, 2014

(65) Prior Publication Data
US 2016/0132298 A1 May 12, 2016

(51) Int. Cl.
*G06F 9/44* (2006.01)
(52) U.S. Cl.
CPC . *G06F 8/35* (2013.01); *G06F 8/34* (2013.01)
(58) Field of Classification Search
None
See application file for complete search history.

(56) References Cited

U.S. PATENT DOCUMENTS

2009/0193294 A1* 7/2009 Nakamura ........ G06F 11/3612
714/26
2011/0252398 A1* 10/2011 Lejeune ................ G10L 15/22
717/104

OTHER PUBLICATIONS

IBM Bluemix, "Bluemix Overview," https://www.ng.bluemix.net/docs/#overview/overview.html#overview, Aug. 23, 2014, 9 pages.
Long, "I Don't Speak You Language: Frontend vs. Backend," http://blog.teamtreehouse.com/i-dont-speak-your-language-frontend-vs-backend, Sep. 25, 2012, 13 pages.
Stack Overflow, "Is it possible to write the backend using Javascript?" http://stackoverflow.com/questions/11652026/is-it-possible-to-write-the-backend-using-javascript, Jul. 25, 2012, 2 pages.
StrongLoop, "Mobile App Development with Full-Stack Javascript," http://strongloop.com/strongblog/mobile-app-development-with-full-stack-javascript-part-1-of-4-loopback/,Dec. 12, 2013, 6 pages.
Wikipedia, "Abstract Machine," http://en.wikipedia.org/wiki/Abstract_machine, Sep. 30, 2014, 3 pages.
Wikipedia, "Mobile Backend as a service," http://en.wikipedia.org/wiki/Mobile_Backend_as_a_service, Oct. 4, 2014, 4 pages.
Wikipedia, "Use case," http://en.wikipedia.org/wiki/Use_case, Oct. 28, 2014, 12 pages.

* cited by examiner

*Primary Examiner* — Qamrun Nahar
(74) *Attorney, Agent, or Firm* — Harrity & Harrity, LLP

(57) ABSTRACT

A device may determine use case information associated with a use case for a development project. The device may determine a set of use case objects associated with the use case based on the use case information. The device may select an abstract machine model. The abstract machine model may be associated with modeling the development project based on the set of use case objects. The abstract machine model may be selected from a set of abstract machine models associated with modeling development projects. The device may generate program code for the development project based on the abstract machine model and the use case information. The device may provide information associated with the generated program code.

20 Claims, 10 Drawing Sheets

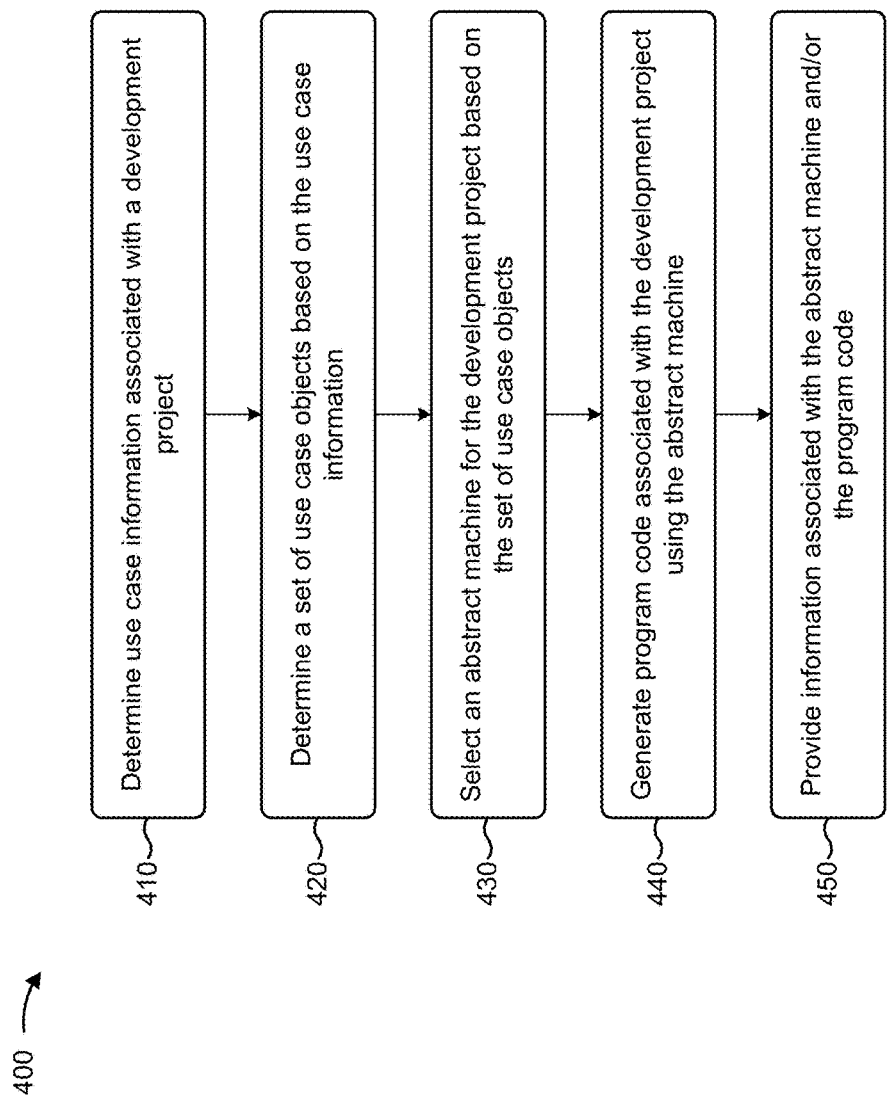

US 9,864,585 B2

RAPID PROTOTYPING OF BACKEND SERVICES

BACKGROUND

Mobile Backend as a service (MBaaS) may be utilized for providing a user with a set of tools for developing a mobile application utilizing backend cloud storage, one or more application programming interfaces (APIs), one or more software development kits (SDKs), or the like. An abstract machine may be utilized as a model for developing software based on a set of use cases.

SUMMARY

According to some possible implementations, a device may determine use case information associated with a use case for a development project. The device may determine a set of use case objects associated with the use case based on the use case information. The device may select an abstract machine model. The abstract machine model may be associated with modeling the development project based on the set of use case objects. The abstract machine model may be selected from a set of abstract machine models associated with modeling development projects. The device may generate program code for the development project based on the abstract machine model and the use case information. The device may provide information associated with the generated program code.

According to some possible implementations, a computer readable medium may store instructions that, when executed by a processor, cause the processor to provide a user interface for user interaction. The instructions may cause the processor to receive, via the user interface, use case information associated with a use case for a development project. The instructions may cause the processor to determine a set of states for the use case based on the use case information. The set of states may describe a set of use case situations governed by a set of conditions. The instructions may cause the processor to determine a set of abstract machine models associated with simulating the use case. The instructions may cause the processor to select, from the set of abstract machine models, a particular abstract machine model capable of modeling the set of states for the use case. The instructions may cause the processor to generate program code for the development project based on the particular abstract machine model and the use case. The instructions may cause the processor to provide information associated with the program code.

According to some possible implementations, a method may include determining, by a device, use case information associated with a use case for a development project. The method may include determining, by the device, one or more use case objects associated with the use case based on pattern matching the use case information against stored use case information associated with another development project. The method may include selecting, by the device, an abstract machine associated with modeling the use case based on the one or more use case objects and the stored use case information associated with the other development project. The method may include generating, by the device, program code for the development project based on the abstract machine associated with modeling the use case. The method may include providing, by the device, information associated with the program code.

BRIEF DESCRIPTION OF THE DRAWINGS

FIG. 4 is a flow chart of an example process for generating program code for a development project;

DETAILED DESCRIPTION

The following detailed description of example implementations refers to the accompanying drawings. The same reference numbers in different drawings may identify the same or similar elements.

Prototyping for a development project may be involve significant programming from scratch and/or significant work to utilize a set of existing libraries, services, or the like. Delivery of a development project may include multiple stages, such as a development stage, a testing stage, or the like. A user may develop a comprehensive use case describing the development project, and may implement the use case by programming via an integrated development environment. However, programming from scratch and/or combining multiple existing libraries, services, or the like, may delay development, and may require extensive programming capability by the user. Implementations, described herein, may assist the user in writing program code for a development project by utilizing a host device to select an abstract machine appropriate for modeling the development project, and generating program code based on the abstract machine model. Furthermore, the host device may monitor the development project, and may utilize a machine learning technique (e.g., a pattern matching technique trained based on other development projects, such as services fingerprinting, or the like) to provide suggestions for the development project, thereby streamlining the development project and reducing a need for advanced programming capability by the user.

Figure 1:
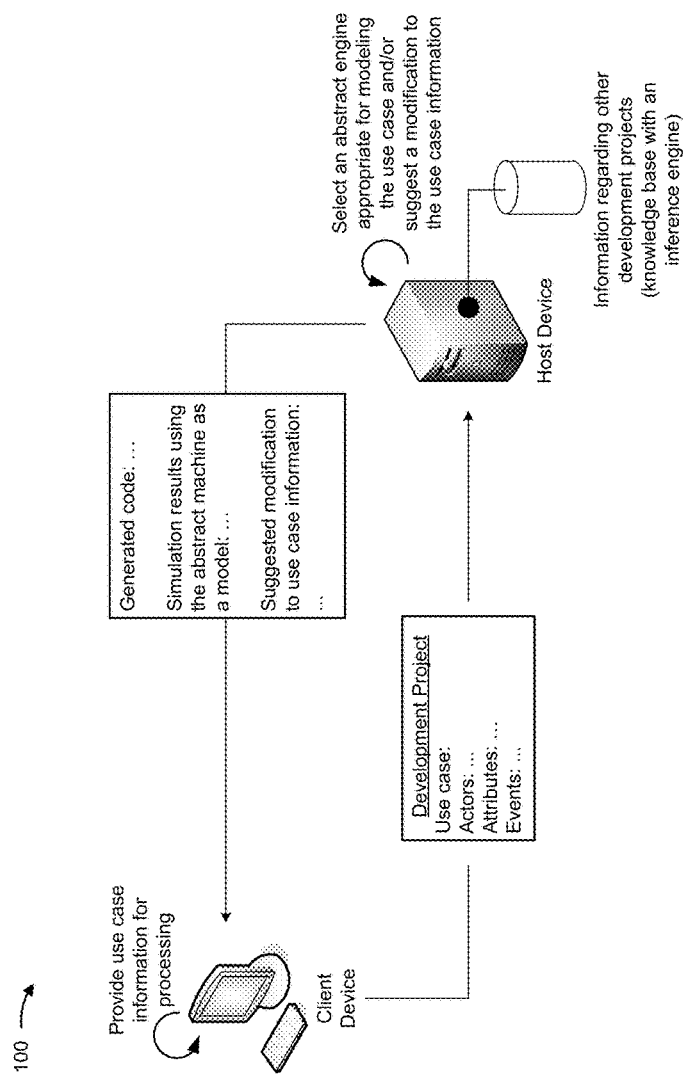
FIG. 1 is a diagram of an overview of an example implementation described herein.

FIG. 1 is a diagram of an overview of an example implementation 100 described herein. As shown in FIG. 1, a client device may provide use case information, specified by a user via a user interface, to a host device. Use case information may refer to a development project specification describing aspects of a service, such as actors involved in the service, events occurring during the service, inputs for performing the service, outputs to be expected from the service, or the like. The host device may include an expert system (e.g., a knowledge base including information associated with other development projects and an inference engine to apply a set of logical rules to the knowledge base to perform a deduction of other information) that has been trained on other development projects.

As further shown in FIG. 1, the host device may utilize the inference engine and the knowledge base to compare one or more use case objects (e.g., one or more objects included in the use case information, such as an actor, an attribute, an event, a condition, or the like) to other use case objects associated with other development projects. Based on the comparison, the host device may determine an appropriate abstract machine for executing the use case (e.g., for managing an input of a service that is to be developed, processing the inputs, and providing a set of desired outputs). An abstract machine may refer to a finite state machine, an infinite state machine, a brokerage engine abstract machine, an event manager and handler abstract machine, a dialogue engine abstract machine, a map-reduce abstract machine, or the like. The host device may determine a score associated with a set of abstract engines (e.g., based on comparing one or more use case objects to other use case objects associated with other development projects), and may select the abstract engine based on the score (e.g., a particular abstract engine that best matches the use case). For example, when the host device compares the one or more use case objects to other use case objects associated with other development projects and determines that the one or more use case objects are associated with a finite number of states, the host device may determine that a finite state machine better matches the use case than an infinite state machine. In this case, the host device may assign a relatively better score to the finite state machine as compared with the infinite state machine, and may select the finite state machine based on the relatively better score.

As further shown in FIG. 1, the host device may generate program code for executing the use case using the selected abstract machine as a model for the generated program code. For example, when the host device selects the finite state machine, the host device may generate program code that models the use case as a finite state machine. In this way, program code is generated for the development project without the user needing an extensive programming background. The host device may provide information associated with the abstract machine and the generated program code, such as by providing the program code to the user via a user interface, by publishing the program code for distribution as a service to a set of users, by performing a set of test simulations on the program code to determine whether the program code accurately models the use case and providing information associated with the set of test simulations, or the like. In some implementations, the host device may iteratively generate program code, perform a set of test simulations on the generated program code, and modify the generated program code based on the set of test simulations.

As further shown in FIG. 1, the host device may monitor user input, and may utilize a machine learning technique (e.g., pattern matching, services fingerprinting, or the like) to suggest a modification, an addition, an inclusion, or the like for the development project. For example, the host device may utilize the inference engine and the knowledge base to compare the use case information to use case information associated with one or more other development projects, and may classify a use case object, determine a parameter for a use case object, determine an attribute for a use case object, determine an association between multiple use case objects, suggest another use case object, or the like. In this way, the host device may recognize provided use case information as matching other use case information, and may suggest information that the user may have failed to include in the use case information. The host device may incorporate the determinations (e.g., a determination of a parameter, an association, or the like) into the development project and/or provide information identifying the determinations to the client device for user approval. In this way, the host device may simplify creation of use case information by suggesting missing, mistaken, or associated information.

Figure 2:
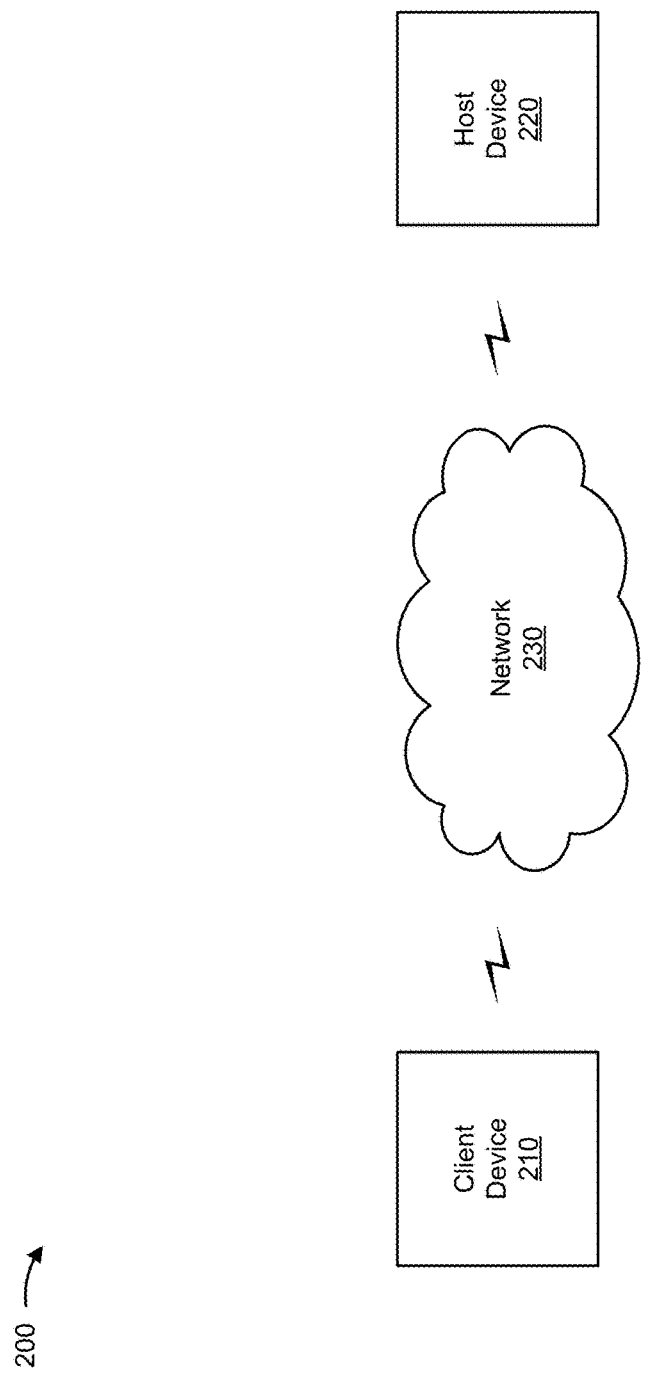
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a host device 220, and a network 230. Devices of environment 200 may interconnect via wired connections, wireless connections, or a combination of wired and wireless connections.

Client device 210 may include a device capable of receiving, generating, storing, processing, and/or providing information associated with a development project. For example, client device 210 may include a communications and/or computing device, such as a mobile phone (e.g., a smart phone, a radiotelephone, etc.), a desktop computer, a laptop computer, a tablet computer, a handheld computer, or a similar device. In some implementations, client device 210 may provide a software development environment, a user interface, or the like for user input. In some implementations, client device 210 may receive information from and/or transmit information to another device in environment 200.

Host device 220 may include may include one or more devices capable of storing, processing, and/or routing information associated with a development project. For example, host device 220 may include a server that utilizes an expert system including a knowledge base and an inference engine to analyze a use case and provide project development assistance. A knowledge base may refer to a data structure storing information regarding development projects, such as information identifying an actor, an event, a utility, a service, a particular abstract machine used for a particular development project, or the like. An inference engine may refer to a processing module for applying logical rules to information stored via the knowledge base, such as by backward chaining, by forward chaining, pattern matching, semantic analysis, or the like, to deduce a conclusion regarding a particular development project, such as a determination of an actor, an event, a behavior, an appropriate abstract machine for modeling the use case, a set of states associated with the use case, or the like. A state for a use case may describe a use case situation (e.g., information values associated with the use case) governed by a particular condition (e.g., a particular time. In some implementations, host device 220 may include a communication interface that allows host device 220 to receive information from and/or transmit information to other devices in environment 200.

Network 230 may include one or more wired and/or wireless networks. For example, network 230 may include a cellular network (e.g., a long term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although client device 210 and host device 220 are shown as two separate devices, client device 210 and host device 220 may be implemented within a single device. Additionally, or alternatively, a set of devices (e.g., one or more devices) of environment 200 may perform one or more functions described as being performed by another set of devices of environment 200.

Figure 3:
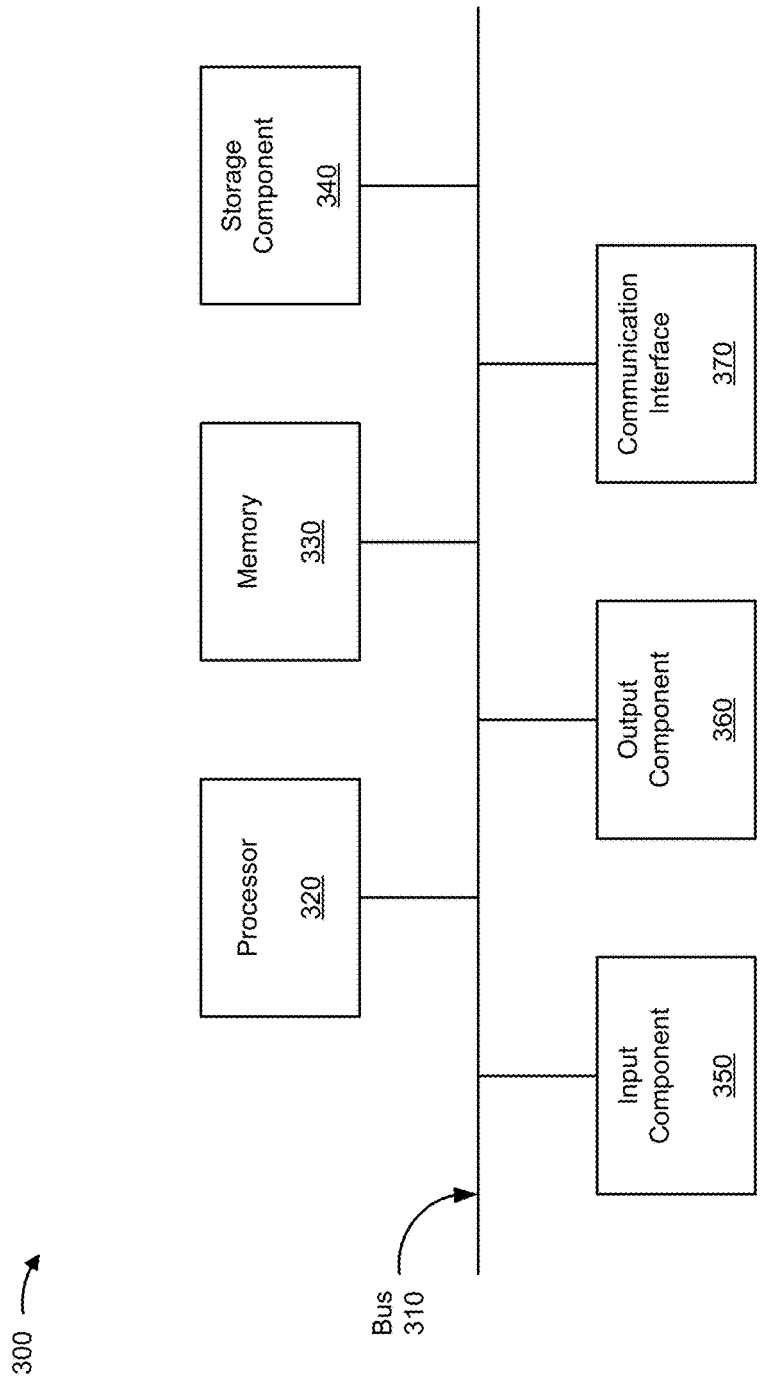
FIG. 3 is a diagram of example components of one or more devices of FIG. 2.

FIG. 3 is a diagram of example components of a device 300. Device 300 may correspond to client device 210 and host device 220. In some implementations, client device 210 and/or host device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating program code for a development project. In some implementations, one or more process blocks of FIG. 4 may be performed by host device 220. In some implementations, one or more process blocks of FIG. 4 may be performed by another device or a group of devices separate from or including host device 220, such as client device 210.

As shown in FIG. 4, process 400 may include determining use case information associated with a development project (block 410). For example, host device 220 may determine use case information associated with the development project. A development project may refer to a software development project for creating a service that may be utilized by a set of users. Use case information may refer to information associated with a use case (e.g., a specification of information associated with a state diagram model corresponding to a development project associated with a MBaaS service), such as information identifying a set of use case objects (e.g., state diagram structures, such as an actor, an event, or the like), information identifying a set of use case object attributes, or the like.

Host device 220 may receive use case information from client device 210, in some implementations. For example, client device 210 may provide a user interface for a user to input use case information, and may provide the use case information to host device 220. In some implementations, host device 220 may receive, from client device 210, use case information identifying one or more use case objects, such as an actor (e.g., a user, a computer, a software module, or the like), an event (e.g., a description of an interaction between an actor and a system executing a particular use case), an input, a precondition, a minimal guarantee (e.g., a condition upon which a particular use case is to terminate), a success scenario (e.g., a condition that will be true when the particular use case terminates successfully), or the like. Additionally, or alternatively, host device 220 may receive, from client device 210, use case information identifying a flow chart. For example, client device 210 may facilitate creation of a flow chart representing the use case via a user interface, and may provide information identifying the flow chart (e.g., a state diagram, a use case diagram, or the like) to host device 220 for processing.

Additionally, or alternatively, host device 220 may determine use case information based on comparing use case information received from client device 210 to other use case information stored via a data structure (e.g., a knowledge base). For example, host device 220 may identify a particular actor based on information from the user, and may determine that the particular actor corresponds to an actor specified by another user for another development project.

In this case, host device 220 may determine that attributes specified for the actor by the other user for the other development project may be incorporated into the use case information. Additionally, or alternatively, host device 220 may determine the use case information by utilizing one or more machine learning techniques, such as utilizing a pattern matching technique, a services fingerprinting technique, or the like.

Additionally, or alternatively, host device 220 may determine the use case information based on processing a state diagram (e.g., a use case diagram). For example, client device 210 may provide a user interface for designing a particular state diagram, and may provide the particular state diagram to host device 220 for processing. In this case, host device 210 may apply a processing technique, such as an image recognition technique, a pattern recognition technique, or the like, to determine use case information from the particular state diagram.

In some implementations, host device 220 may request that the user provide approval when host device 220 incorporates determined information into the use case information. For example, host device 220 may determine that a particular event, specified by the user via the use case information, is associated with a set of outputs, and may request that the user confirm the determination. In this way, host device 220 may streamline the process of completing a development project by interactively determining and suggesting additions, optimizations (e.g., information that may reducing processing requirements, storage requirements, or the like), inclusions (e.g., services, utilities, or the like that may be included), or the like relating to the development project.

As further shown in FIG. 4, process 400 may include determining a set of use case objects based on the use case information (block 420). For example, host device 220 may determine the set of use case objects based on the use case information. A use case object may refer to an actor, an event, an input, or the like, associated with the use case. In some implementations, host device 220 may identify the one or more use case objects based on processing the use case information, such as by applying semantic analysis, natural language processing, or the like. Additionally, or alternatively, client device 210 may identify the one or more use case objects when providing the use case information, and host device 220 may receive the identification.

In some implementations, host device 220 may identify one or more use case objects based on comparing the use case information to other use case information (e.g., associated with other development projects). For example, when the use case information includes a set of attributes, host device 220 may identify an actor associated with the set of attributes based on analyzing other use case information including the set of attributes. In some implementations, host device 220 may request that the user confirm and/or approve of the identification of the one or more use case objects. For example, when the user provides (e.g., via client device 210) use case information identifying a development project relating to call alerts, host device 220 may utilize services fingerprinting to determine that previous use cases relating to call alerts included a calling party (e.g., a first actor) and a called party (e.g., a second actor). In this case, host device 220 may provide information to client device 210 requesting user approval of including the calling party and the called party as actors for the development project. In this way, host device 220 may facilitate completion of a development project by a user lacking experience in model-based software development.

Host device 220 may determine a set of parameters associated with a use case object, in some implementations. For example, host device 220 may determine a parameter associated with an actor, such as an identifier, an address, a set of associations with other use case objects, or the like. Additionally, or alternatively, host device 220 may determine a particular set of parameters associated with another use case object, such as a set of states associated with a particular use case object, a set of inputs that may be encountered by the particular use case object, or the like. In some implementations, host device 220 may infer a set of parameters based on comparing the one or more use case objects to corresponding use case objects associated with other development projects for which one or more parameters have been defined.

As further shown in FIG. 4, process 400 may include selecting an abstract machine for the development project based on the set of use case objects (block 430). For example, host device 220 may select the abstract machine appropriate for modeling the use case of the development project. An abstract machine may refer to a computational model for analysis of a computational problem. For example, host device 220 may select a finite state machine (e.g., a model for simulating a use case that may be represented by a set of finite states), an infinite state machine (e.g., a model for simulating a use case that runs perpetually with an infinite set of states), a brokerage engine abstract machine (e.g., a service broker model for simulating a use case utilizing a set of application programming interface (API) calls that include wrapper functions, source masking, destination masking, or the like), an event manager and handler abstract machine (e.g., a model for simulating a use case utilizing a set of concurrent events), a dialogue abstract machine (e.g., a model for simulating a use case including a set of dialogues between a set of entities), a map-reduce abstract machine (e.g., a model for simulating a use case including a set of concurrent execution paths), or the like. In some implementations, an abstract machine may be associated with a particular set of program code instructions, inputs, outputs, or the like.

Host device 220 may process the set of use case objects to select the abstract machine, in some implementations. For example, host device 220 may analyze the set of use case objects, and may determine that the set of use case objects are associated with a particular set of states, and may select the abstract machine based on the particular set of states. In some implementations, host device 220 may determine that the use case includes a set of objects that may be correctly modeled by a first abstract machine and incorrectly modeled by a second abstract machine, and may select the first abstract machine. For example, when analyzing a use case for handling a telephone call, host device 220 may determine that the telephone call includes a finite set of states (e.g., an idle state, a dialing state, a ringing state, a connected state, and a disconnected state), and may determine that a finite state machine is appropriate for modeling the telephone call and an infinite state machine is inappropriate.

Host device 220 may compare the set of use case objects with stored information regarding other development projects to select the abstract machine, in some implementations. For example, when host device 220 determines an abstract machine for use with another development project, host device 220 may store an association between the abstract machine and use case information for the other development project, and may compare use case information for the development project against the use case information for the other development project to determine whether the abstract machine selected for the other development project is appropriate for use in (i.e., for modeling computations associated with) the development project. In this case, host device 220 may determine that a threshold similarity is satisfied for the other use case information and the use case information, and may select the abstract machine based on the threshold similarity being satisfied. Additionally, or alternatively, host device 220 may determine that the development project relates to a particular service (e.g., an application for providing a particular service to a set of application users), and may select the abstract machine based on the particular service.

Host device 220 may determine a score for a set of abstract machines, and may select the abstract machine based on the score. For example, host device 220 may determine a score representing an extent to which a particular abstract machine may model the set of use case objects (e.g., based on a set of states associated with the use case, a set of objects associated with the use case, or the like). In some implementations, host device 220 may select a particular abstract machine, from the set of abstract machines, based on the score for the abstract machine being relatively higher than the scores for the other abstract machines. Additionally, or alternatively, host device 220 may select the particular abstract machine based on the score satisfying a threshold, being a particular percentage greater than other scores, or the like. In some implementations, host device 220 may provide a set of scores for the set of abstract machines to client device 210 for user selection. Additionally, or alternatively, host device 220 may perform a best fit analysis, to determine that a particular abstract machine is a better fit for modeling the use case information than another abstract machine.

Host device 220 may access a set of instructions indicating which abstract machine of a particular set of abstract machines to select. For example, host device 220 may utilize a knowledge base including a set of logical rules associated with selection of the abstract machine, and may select the abstract machine based on applying an inference engine to process the set of logical rules and use case information associated with the set of logical rules. For example, when use case information indicates a finite quantity of states, host device 220 may access a set of instructions indicating that a finite state machine is to be selected for a use case that includes a finite quantity of states.

As further shown in FIG. 4, process 400 may include generating program code associated with the development project using the abstract machine (block 440). For example, host device 220 may generate program code associated with the development project using the abstract machine as a model. In some implementations, host device 220 may access a set of instructions associated with mapping a set of use case objects to a set of program code functions associated with the selected abstract machine. For example, when host device 220 selects a finite state machine, host device 220 may access a set of instructions indicating a manner in which a set of use case objects are to be expressed as program code under a finite state machine model.

In some implementations, host device 220 may generate program code iteratively to match the set of use case objects to the abstract machine model. For example, host device 220 may generate first program code and a set of test cases associated with testing the first program code. In this case, host device 220 may test the first program code using the set of test cases, and may generate second program code based on determining one or more flaws in the first program code (e.g., observed outputs that fail to match expected outputs, or the like)

Host device 220 may select multiple abstract machines for multiple characteristics of the development project, in some implementations. For example, host device 220 may select a finite state machine for a first characteristic of the development project (e.g., for simulating information associated with a first set of use case objects) and a brokerage engine abstract machine for a second characteristic of the development project (e.g., for simulating information associated with a second set of use case objects).

As further shown in FIG. 4, process 400 may include providing information associated with the abstract machine and/or the program code (block 450). For example, host device 220 may provide the program code to client device 210 for review, alteration, modification, packaging, publishing, or the like by a user. In some implementations, host device 220 may generate a set of test cases associated with simulating the development project, may utilize the set of test cases to simulate the development project, and may provide information associated with simulating the development project. In this way, host device 220 may automate portions of the software development process, thereby reducing development time and reducing the need for technical expertise by the user.

Host device 220 may provide information associated with the generated program code, such as a score for the abstract machine, a confidence score associated with whether the generated program code accurately embodies the use case information, or the like, in some implementations. For example, host device 220 may compare the generated program code for the development project with generated program code for other development projects with similar use case information, and may provide an indication of the comparison. In this way, host device 220 may provide information indicating an extent to which program code may be required to be reworked prior to publication.

Host device 220 may generate a use case diagram (e.g., a state diagram) associated with the use case, in some implementations. For example, host device 220 may represent the set of use case objects and the generated program code via a use case diagram, and may provide the use case diagram to client device 210 for display via a user interface. In this way, a user who is unfamiliar with a particular program code language may nevertheless verify the accuracy of the generated program code by comparing the provided use case diagram with an expected use case diagram.

Host device 220 may provide information associated with the selected abstract machine, in some implementations. For example, host device 220 may provide information indicating a confidence in the accuracy of the selected abstract machine in modeling behavior associated with the use case information, such as a score associated with abstract machine selection, or the like. In this way, host device 220 may provide information that the user may utilize in altering the program code, testing the program code, or the like. In some implementations, host device 220 may request user feedback associated with the selected abstract machine and the generated program code. For example, host device 220 may request that a final version of the program code be provided for incorporation into the knowledge base. In this way, host device 220 may improve future abstract machine selections and/or future program code generations.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of generating program code for a development project.

Figure 5A:
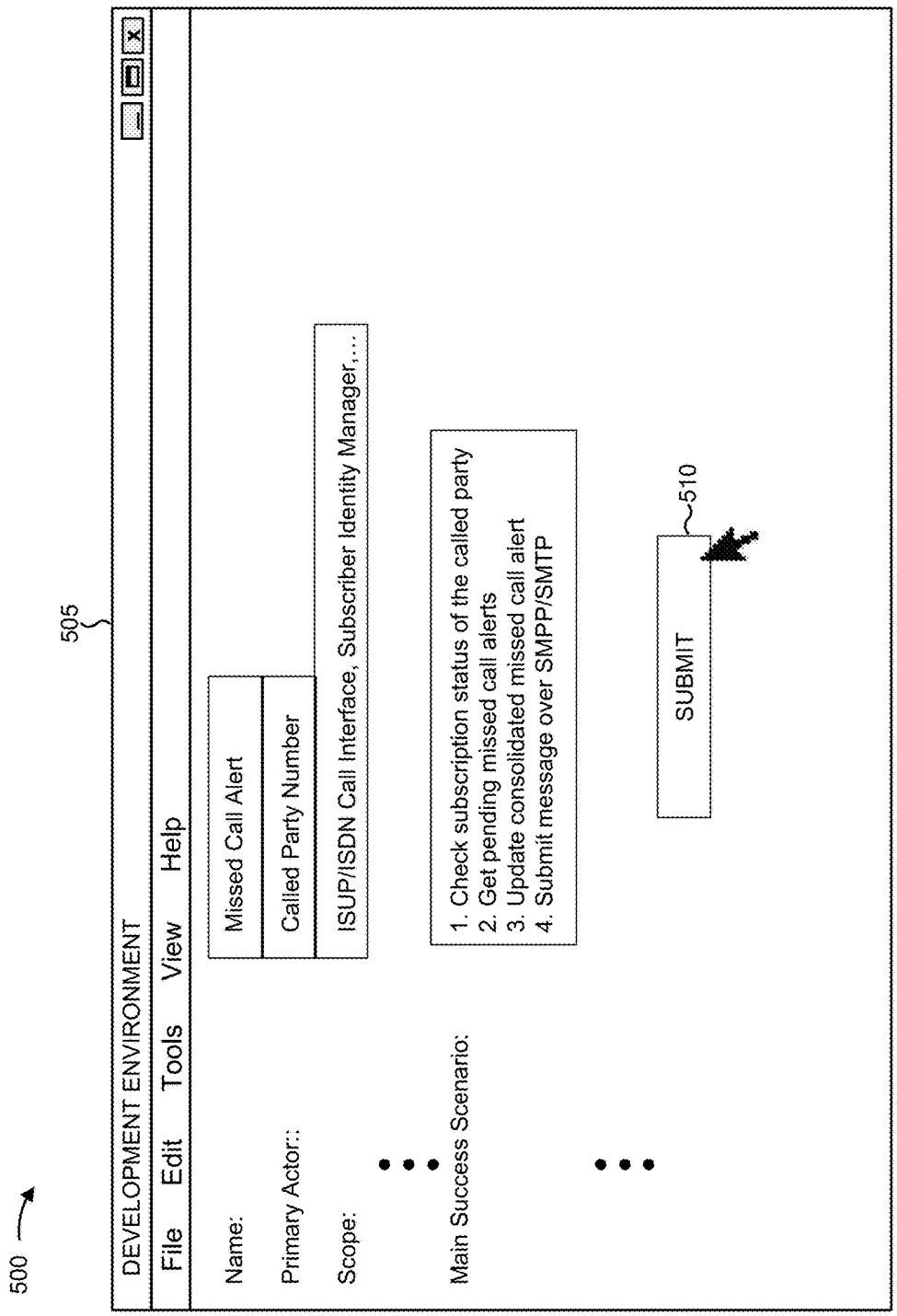
FIGS. 5A-5D are diagrams of an example implementation relating to the example process shown in FIG. 4.

As shown in FIG. 5A, and by reference number 505, client device 210 provides a development environment for user input of use case information. The user inputs use case information describing a primary actor for the use case, a scope for the use case, a main success scenario for the use case, or the like. The use case information describes a development project for developing a missed call alert service (i.e., a service for providing a missed call alert to a user). The use case information for the missed call alert service identifies a particular actor (e.g., "Called Party Number") that is to receive the missed call alert, a set of steps for providing the missed call alert (e.g., the main success scenario), and other information associated with describing the missed call alert service. As shown by reference number 510, based on user interaction with a button, client device 210 is to provide the use case information for processing.

Figure 5B:
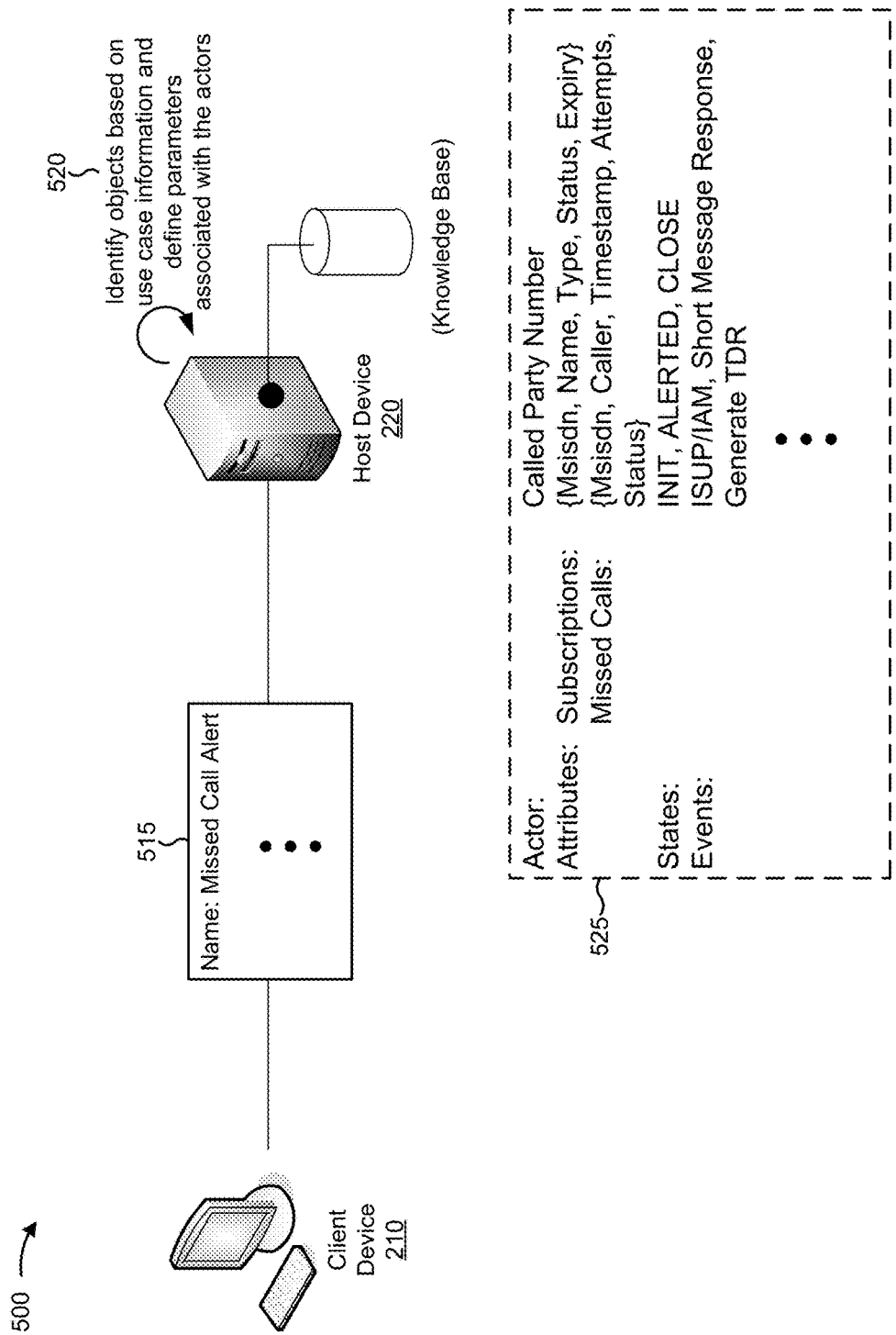

As shown in FIG. 5B, and by reference number 515, client device 210 provides the use case information to host device 220 for processing. Assume that host device 220 is associated with a knowledge base storing information regarding one or more other development projects and an inference engine for processing the knowledge base. As shown by reference number 520 and reference number 525, host device 220 utilizes the inference engine to identify use case objects based on the use case information and to define parameters associated with the use case objects, such as a set of states associated with the use case (e.g., an initial state "INIT," an alerted state "ALERT," and a conclusion state "CLOSE").

Figure 5C:
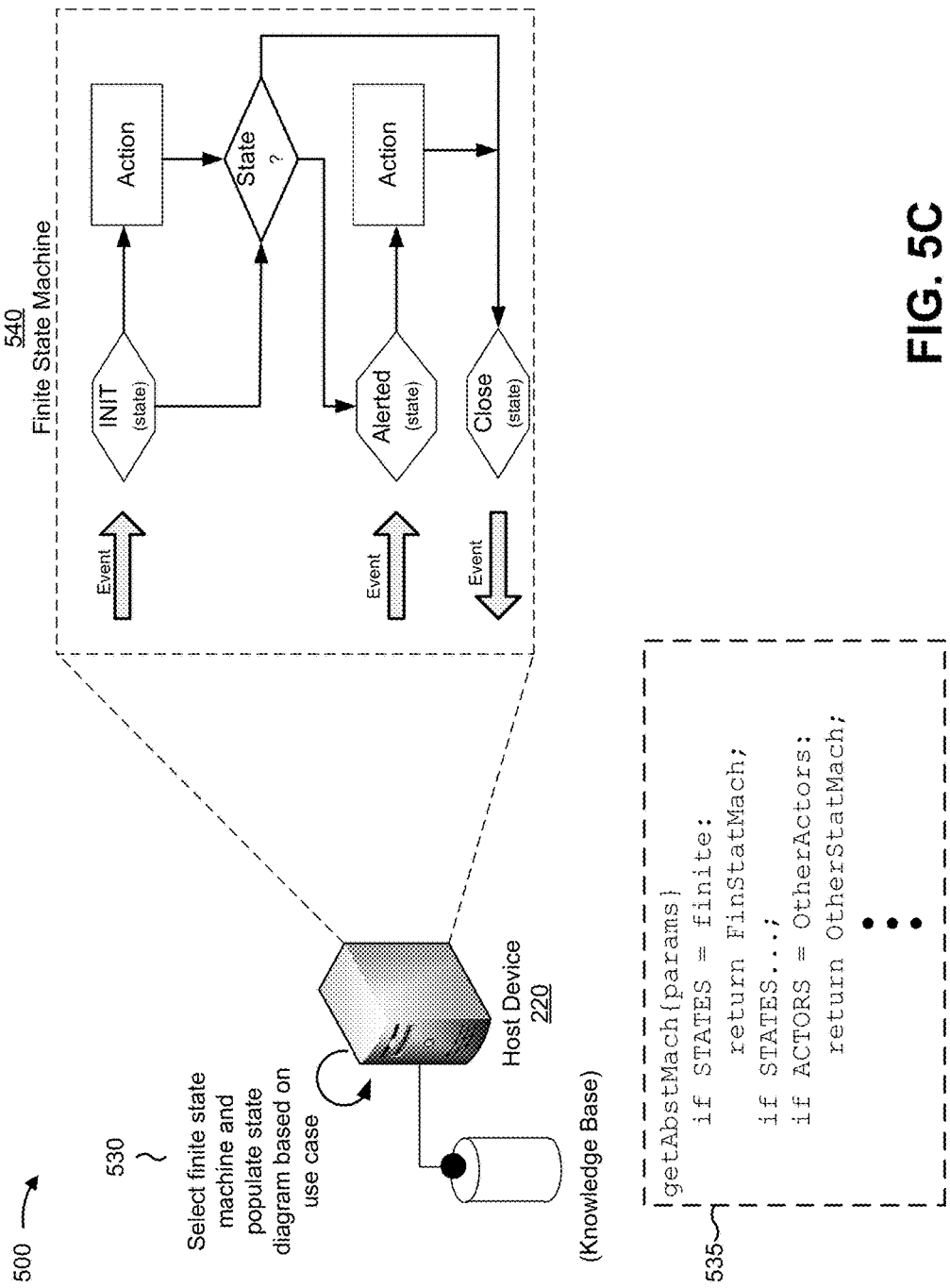

As shown in FIG. 5C, by reference number 530, host device 220 selects a finite state machine (e.g., from a set of abstract machines associated with modeling a backend development project associated with MBaaS service) for modeling the development project based on the defined parameters (e.g., based on a set of instructions 535, indicating that when a finite set of states are determined from the use case information, the finite state machine is to be selected). The finite state machine may be utilized as a model for generating program code that implements the missed call alert service. As shown by reference number 540, host device 220 constructs a state diagram for the missed call alert development project utilizing the finite state machine as a model (e.g., a graphical representation of the missed call alert service that may be provided to the user, utilized when generating program code, or the like).

Figure 5D:
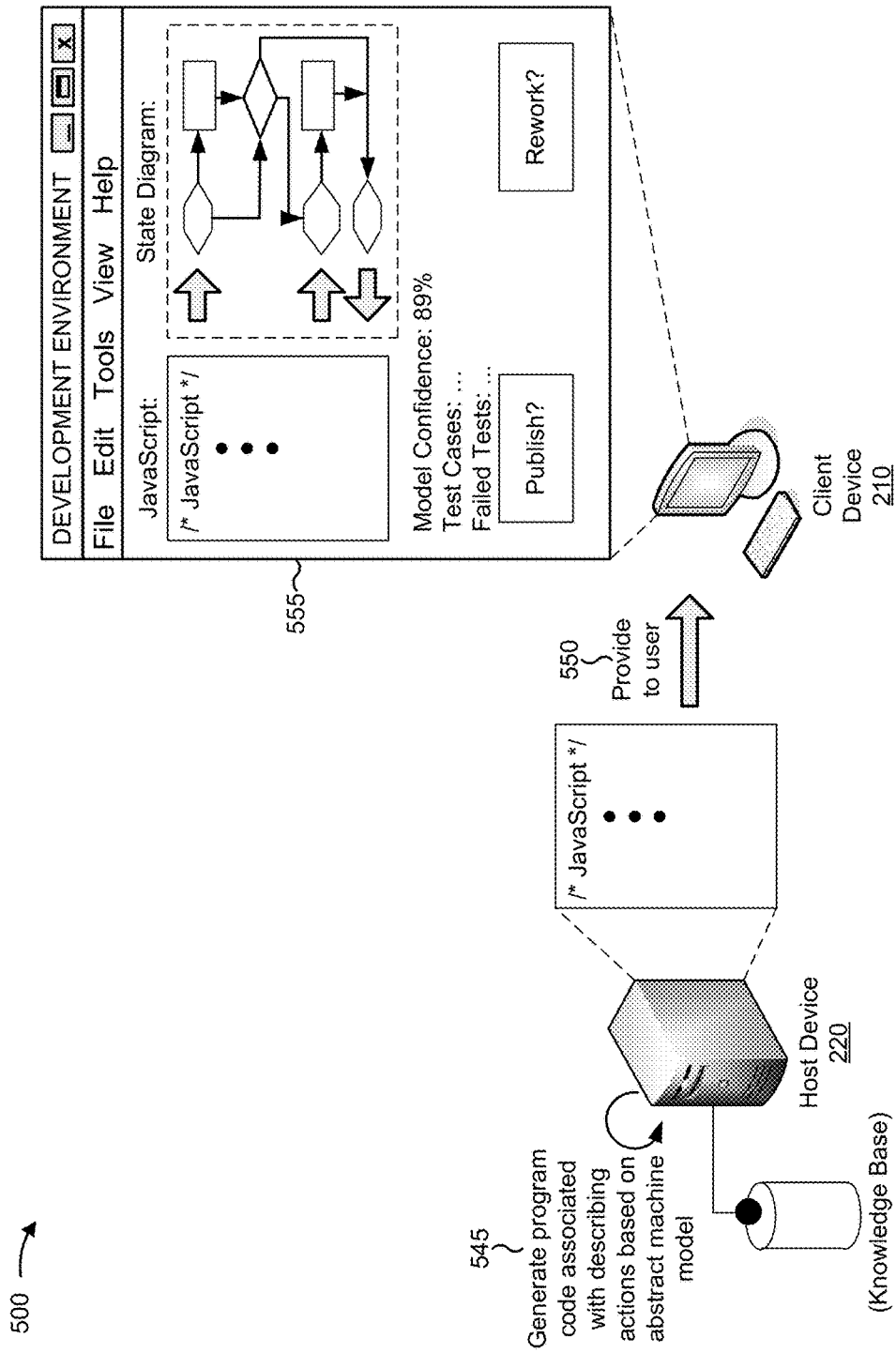

As shown in FIG. 5D, and by reference number 545, host device 220 generates program code (e.g., JavaScript program code) associated with describing actions of the use case information using the finite state machine and the state diagram as models for generating the program code. As shown by reference number 550, host device 220 provides the generated program code to client device 210. As shown by reference number 555, client device 210 provides information identifying the program code, information identifying a confidence with which the abstract machine was selected as a model for the program code, information associated with executing program code to simulate the missed call alert development project (e.g., a set of test cases, a set of failed test cases, or the like), and provides a first user option to publish the program code (e.g., make the missed call alert service available for one or more users to utilize) and a second user option to rework the program code (e.g., modify the program code).

In this way, host device 220 may utilize an inference engine and a knowledge base to generate program code for a use case, thereby simplifying a development project for a user and expediting publishing of new software services.

As indicated above, FIGS. 5A-5D are provided merely as an example. Other examples are possible and may differ from what was described with regard to FIGS. 5A-5D.

Figure 6A:
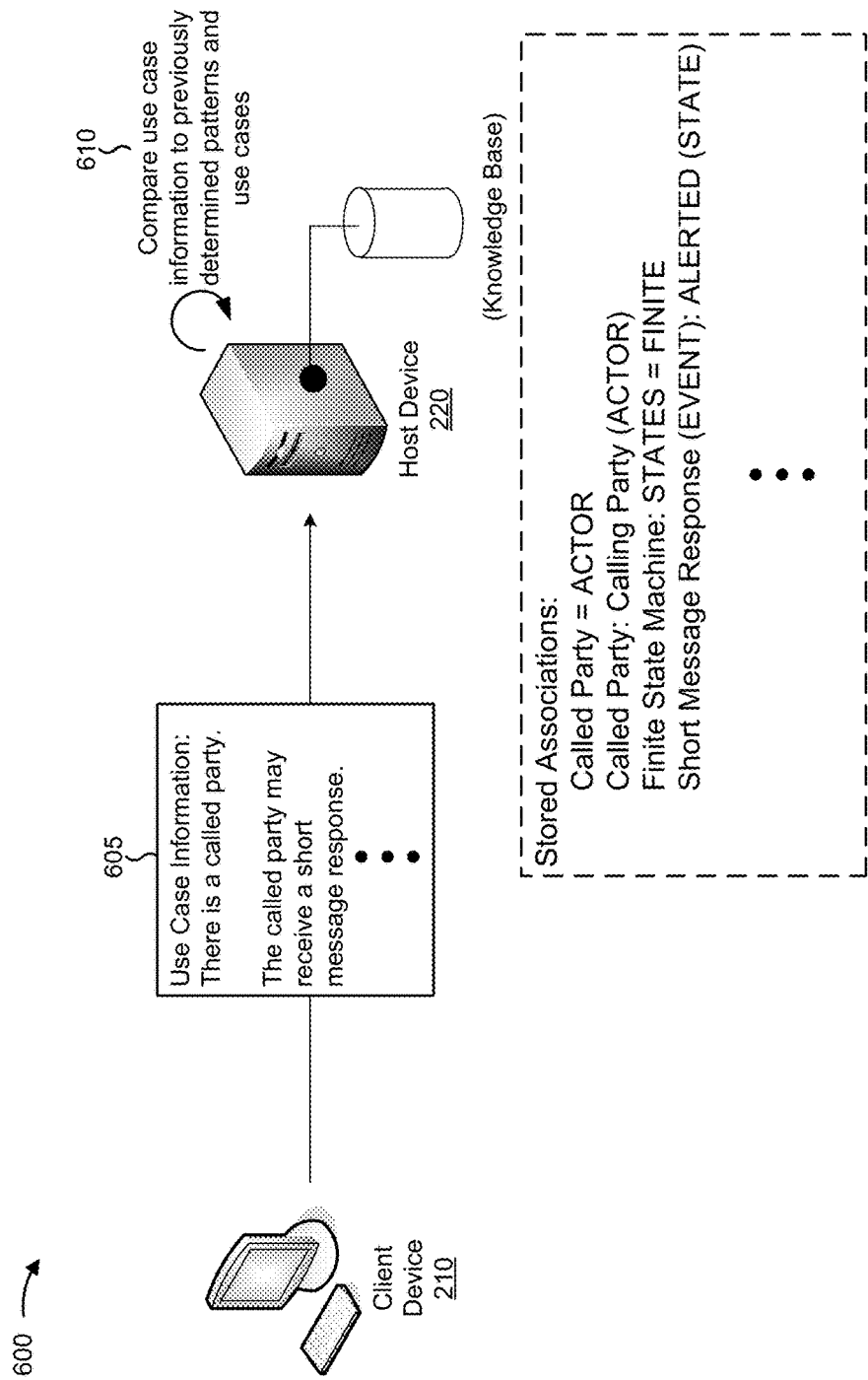
FIGS. 6A and 6B are diagrams of another example implementation relating to the example process shown in FIG. 4.
Figure 6B:
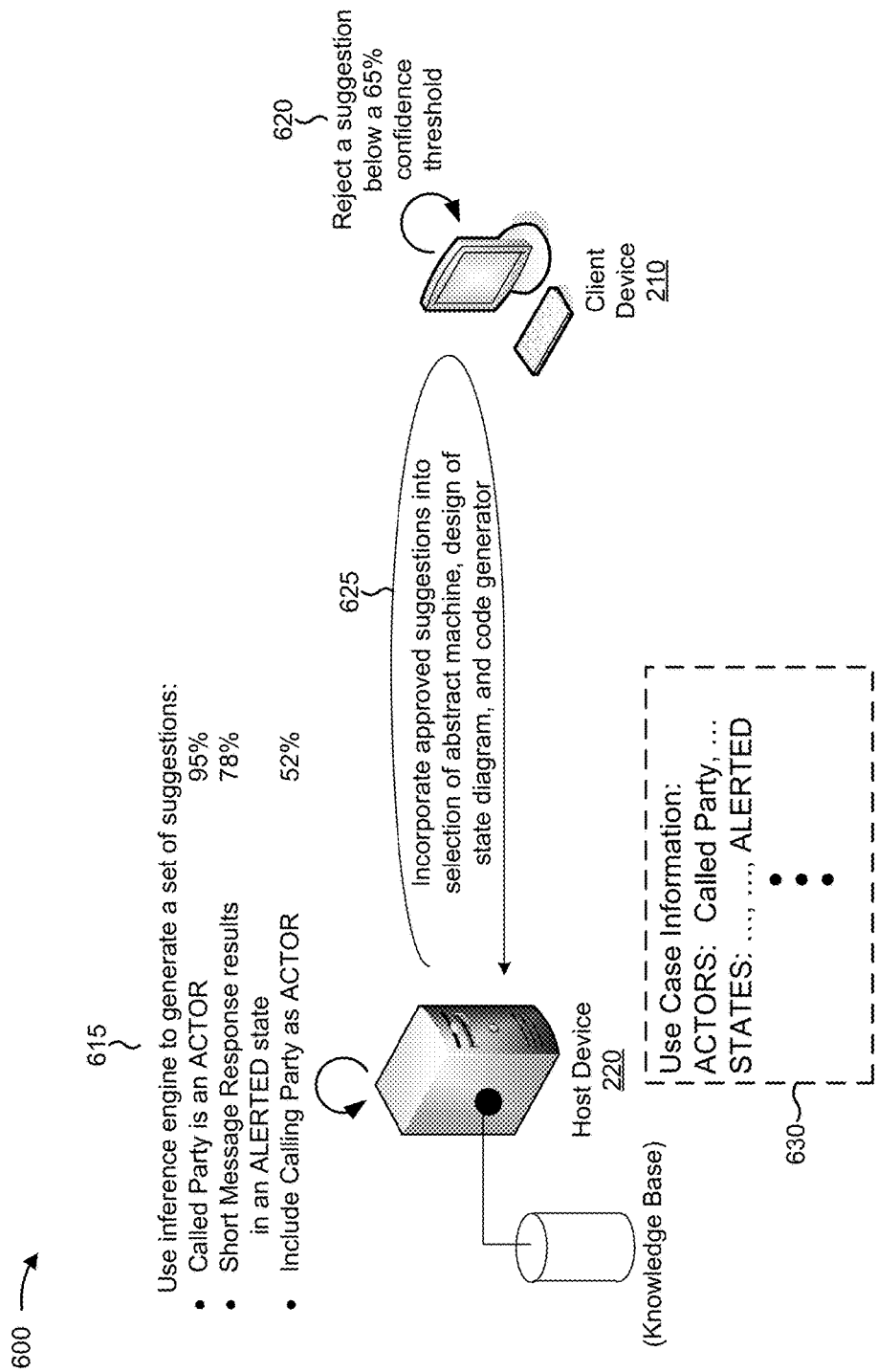

FIGS. 6A and 6B are diagrams of an example implementation 600 relating to example process 400 shown in FIG. 4. FIGS. 6A and 6B show an example of generating program code for a development project.

As shown in FIG. 6A, and by reference number 605, client device 210 provides use case information associated with a development project to host device 220 for processing (e.g., natural language processing, semantic analysis, pattern matching, or the like). Assume that host device 220 is associated with a knowledge base storing information regarding one or more other development projects and an inference engine for processing the knowledge base (e.g., a set of information associations determined based on the information regarding the one or more other development projects). As shown by reference number 610, host device 220 utilizes the inference engine to compare the use case information to previously determined patterns (e.g., previously determined associations between first use case information and second use case information, such as a "called party" being an actor, a "calling party" being utilized when a "called party" is utilized, a finite state machine being associated with modeling use cases for which a finite quantity of states exist, a "short message response" being an event associated with an "ALERTED" state, or the like) and use cases associated with previous development projects.

As shown in FIG. 6B, and by reference number 615, host device 220 utilizes the inference engine to generate a set of suggestions for incorporation into the use case information, such as a suggestion regarding identifying an actor, a suggestion regarding a state that may be associated with an event, and a suggestion identifying an another actor to be included. Assume that host device 220 determines a confidence score for each suggestion. As shown by reference number 620, host device 220 receives information from client device 210 indicating that a particular suggestion with a particular confidence score failing to satisfy a threshold is to be rejected. As shown by reference number 625, host device 220 incorporates suggestions with confidence scores satisfying the threshold into the use case information that may be utilized to select an abstract machine, design a state diagram, and generate program code. As shown by reference number 630, host device 220 includes information determined by the inference engine in the use case information.

In this way, host device 220 may utilize an inference engine to streamline a development project by providing suggestions that automate generation of the use case information and aid in processing the use case information, thereby improving the software development process.

As indicated above, FIGS. 6A and 6B are provided merely as an example. Other examples are possible and may differ from what was described with regard to FIGS. 6A and 6B.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Program code (sometimes referred to herein as code) is to be broadly interpreted to include text-based code (e.g., C++ code, Java code, JavaScript code, another type of hardware and/or software based code that may be compiled and/or synthesized, or the like), binary code that may be executed, text files that may be executed in conjunction with other executables, source code, machine code, or the like. In some implementations, program code may include different combinations of the above-identified classes of code. Additionally, or alternatively, program code may be of any type, such as a function, a script, an object, or the like.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
determine use case information associated with a use case for a development project;
determine a set of use case objects associated with the use case based on the use case information;
select an abstract machine model,
the abstract machine model being associated with modeling the development project based on the set of use case objects,
the abstract machine model being selected from a set of abstract machine models associated with other modeling development projects based on the use case information, associated with the use case for the development project, and other use case information associated with the other modeling development projects;
generate program code for the development project based on the abstract machine model and the use case information; and
provide information associated with the generated program code.

2. The device of claim 1, where the one or more processors, when generating program code for the development project, are further to:
generate program code associated with executing one or more characteristics of the use case; and
where the one or more processors, when providing information associated with the generated program code, are further to:
provide the generated program code.

3. The device of claim 1, where the one or more processors are further to:
create a graphical representation of the use case illustrating the set of use case objects based on the abstract machine model; and
where the one or more processors, when providing information associated with the generated program code, are further to:
provide information associated with the graphical representation of the use case.

4. The device of claim 1, where the one or more processors are further to:
store information associated with the other modeling development projects via a data structure; and
where the one or more processors, when determining the set of use case objects, are further to:
receive the stored information associated with the other modeling development projects,
the stored information including the other use case information associated with the other modeling development projects; and
determine the set of use case objects based on comparing the use case information to the other use case information associated with the other modeling development projects.

5. The device of claim 1, where the one or more processors, when selecting the abstract machine model, are further to:
receive information from a knowledge base,
the knowledge base being a data structure storing information regarding the other modeling development projects;
utilize an inference engine to process the information from the knowledge base and determine a set of confidence scores for the set of abstract machine models,
a particular confidence score, of the set of confidence scores, indicating an extent to which a particular abstract machine model, of the set of abstract machine models, matches behavior associated with the use case information; and
select the abstract machine model from the set of abstract machine models based on the set of confidence scores for the set of abstract machine models.

6. The device of claim 1, where the one or more processors, when determining use case information, are further to:
detect information associated with generating a use case;
pattern match the detected information against the other use case information associated with the other modeling development projects;
determine particular use case information based on pattern matching the detected information against the other use case information; and
incorporate the particular use case information into the use case information associated with the use case for the development project.

7. The device of claim 1, where the one or more processors, when determining the set of use case objects, are further to:
identify an actor as a particular use case object of the set of use case objects;
determine a set of attributes associated with the actor; and
where the one or more processors, when selecting the abstract machine model, are further select the abstract machine model based on the set of attributes associated with the actor.

8. A computer-readable medium storing instructions, the instructions comprising:
one or more instructions that, when executed by one or more processors, cause the one or more processors to:
provide a user interface for user interaction;
receive, via the user interface, use case information associated with a use case for a development project;
determine a set of states for the use case based on the use case information,
the set of states describing a set of use case situations governed by a set of conditions;
determine a set of abstract machine models associated with simulating the use case,
the set of abstract machine models being associated with other modeling development projects;
select, from the set of abstract machines models, a particular abstract machine model capable of modeling the set of states for the use case based on the use case information, associated with the use case for the development project, and other use case information associated with the other modeling development projects;
generate program code for the development project based on the particular abstract machine model and the use case; and
provide information associated with the program code.

9. The computer-readable medium of claim 8, where the one or more instructions, when executed by the one or more processors, further cause the one or more processors to:
generate a set of program code tests for the program code;
simulate the program code using the set of program code tests; and
where the one or more instructions, that cause the one or more processors to provide information associated with the program code, further cause the one or more processors to:
provide information associated with simulating the program code using the set of program code tests.

10. The computer-readable medium of claim 9, where the one or more instructions, when executed by the one or more processors to, further cause the one or more processors to:
determine an accuracy score associated with the set of program code tests for the program code;
determine that the accuracy score fails to satisfy an accuracy score threshold;
select another abstract machine model from the set of abstract machine models;
generate other program code for the development project based on the other abstract machine model and the use case; and
provide information associated with the other program code.

11. The computer-readable medium of claim 8, where the one or more instructions, that cause the one or more processors to select the particular abstract machine model capable of modeling the set of states for the use case, are further to:
identify one or more states, that correspond to one or more states of the set of states, associated with the other modeling development projects;
identify one or more abstract machines models, from the set of abstract machines models, associated with modeling the one or more states that correspond to the one or more states of the set of states; and
select the particular abstract machine model based on identifying the one or more abstract machines models associated with modeling the one or more states that correspond to the one or more states of the set of states.

12. The computer-readable medium of claim 8, where the one or more instructions, when executed by the one or more processors, further cause the one or more processors to:
store information associated with selecting the particular abstract machine model; and
utilize the stored information associated with selecting the particular abstract machine model for selecting another abstract machine model for another development project.

13. The computer-readable medium of claim 8, where the one or more instructions, when executed by the one or more processors, further cause the one or more processors to:
compare the use case information to the other use case information associated with the other modeling development projects;
determine proposed use case information associated with the development project based on comparing the use case information to the other use case information associated with the other modeling development projects;
determine that a confidence score associated with the proposed use case information satisfies a threshold; and
incorporate the proposed use case information into the use case information based on determining that the confidence score associated with the proposed use case information satisfies the threshold.

14. The computer-readable medium of claim 8, where the one or more instructions, that cause the one or more processors to select the particular abstract machine model, are further to:
receive stored information from a knowledge base that stores information associated with selecting the particular abstract machine model;
process the stored information from the knowledge base using an inference engine,
the inference engine being capable of applying a set of logical rules to the stored information to deduce information regarding selection of the particular abstract machine model; and
select the particular abstract machine model based on processing the stored information from the knowledge base using the inference engine.

15. A method, comprising:
determining, by a device, use case information associated with a use case for a development project;
determining, by the device, one or more use case objects associated with the use case based on pattern matching the use case information against stored use case information associated with another development project;
selecting, by the device, an abstract machine associated with modeling the use case based on the one or more use case objects and the stored use case information associated with the other development project,
the abstract machine being selected from a set of abstract machines associated with other development projects based on the use case information, associated with the use case for the development project, and the stored use case information associated with the other development project;
generating, by the device, program code for the development project based on the abstract machine associated with modeling the use case; and
providing, by the device, information associated with the program code.

16. The method of claim 15, where determining the one or more use case objects further comprises:
determining a use case actor associated with interacting with a subject of the use case;
determining a set of use case attributes associated with the use case actor; and
where selecting the abstract machine further comprises:
selecting the abstract machine based on the use case actor and the set of use case attributes.

17. The method of claim 15, where determining the one or more use case objects further comprises:
determining a use case event associated with a transition between a first state, of a set of states for the use case, and a second state, of the set of states for the use case, the transition being associated with a particular condition for the transition being satisfied; and
where selecting the abstract machine further comprises:
selecting the abstract machine based on the use case event.

18. The method of claim 15, further comprising:
determining that the use case includes a finite set of states; and
where selecting the abstract machine further comprises:
selecting a finite state machine,
the finite state machine being included in a set of abstract machines associated with modeling use cases for development projects.

19. The method of claim 15, further comprising:
determining that an infinite state machine is appropriate for modeling information associated with the use case,
the infinite state machine being included in a set of abstract machines associated with modeling use cases for development projects; and
where selecting the abstract machine further comprises:
selecting the infinite state machine.

20. The method of claim 15, further comprising:
identifying a set of abstract machines,
the set of abstract machines including a finite state machine, an infinite state machine, a brokerage engine abstract machine, an event manager and handler abstract machine, a dialogue engine abstract machine, and a map-reduce abstract machine; and
where selecting the abstract machine further comprises:
selecting the abstract machine from the set of abstract machines.

* * * * *